US008037057B2

(12) United States Patent
Burger

(10) Patent No.: US 8,037,057 B2
(45) Date of Patent: Oct. 11, 2011

(54) MULTI-COLUMN STATISTICS USAGE WITHIN INDEX SELECTION TOOLS

(75) Inventor: Louis Martin Burger, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 459 days.

(21) Appl. No.: 12/349,611

(22) Filed: Jan. 7, 2009

(65) Prior Publication Data

US 2010/0174701 A1 Jul. 8, 2010

(51) Int. Cl.
*G06F 17/30* (2006.01)

(52) U.S. Cl. .................... 707/715; 707/705; 707/753

(58) Field of Classification Search .............. 707/705, 707/715, 735, 999.002, 999.007
See application file for complete search history.

(56) References Cited

U.S. PATENT DOCUMENTS

| 5,913,206 | A | | 6/1999 | Chaudhuri et al. | |
|---|---|---|---|---|---|
| 5,950,186 | A | * | 9/1999 | Chaudhuri et al. | 1/1 |
| 5,960,423 | A | * | 9/1999 | Chaudhuri et al. | 707/715 |
| 6,169,983 | B1 | * | 1/2001 | Chaudhuri et al. | 1/1 |
| 6,965,894 | B2 | | 11/2005 | Leung et al. | |
| 2003/0093408 | A1 | * | 5/2003 | Brown et al. | 707/2 |
| 2003/0182272 | A1 | | 9/2003 | Leung et al. | |

OTHER PUBLICATIONS

Chandhuri, S., et al., "An Efficient, Cost-Driven Index Selection Tool for Microsoft SQL Server", *Proceedings of the 23rd International Conference on Very Large Data Bases*, (1997), 146-155.

Dageville, B., et al., "Automatic SQL Tuning in Oracle 10g", *Proceedings of the Thirtieth International Conference on Very Large Data Bases*, (2004), 1098-1109.

Deb, K, "Genetic algorithm in search and optimization: the technique and applications", in: *Proceedings of International Workshop on Soft Computing and Intelligent Systems*, Calcutta, India, (1998), 58-87.

Valentin, G, et al., "A. DB2 Advisor: An Optimizer Smart Enough to Recommend its Own Indexes", *16th International Conference on Data Engineering, 2000. Proceedings.*, (2000), 101-110.

* cited by examiner

*Primary Examiner* — Cheryl Lewis
(74) *Attorney, Agent, or Firm* — Schwegman, Lundberg & Woessner

(57) ABSTRACT

In an example embodiment, a method is illustrated to determine multi-column indexes, the method including receiving one or more structured query language (SQL) queries, the one or more SQL queries defining a workload. A database index analysis tool may be used to determine a plurality of index configurations for executing the workload. Further, leading index configurations may be determined, leading index configurations including a subset of the plurality of index configurations. Also, a statistics database may be updated with complete statistics for the leading index configurations.

18 Claims, 4 Drawing Sheets

MULTI-COLUMN STATISTICS USAGE WITHIN INDEX SELECTION TOOLS

BACKGROUND

Physical database design is often an essential step to implementing a high performance data warehouse. During this process, users must make decisions regarding the physical characteristics of their relational tables and columns. One of the decisions is the selection of columns on which to define indexes to improve query performance.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BRIEF DESCRIPTION OF THE DRAWINGS

Some embodiments are illustrated by way of example and not limitation in the figures of the accompanying drawings in which.

DETAILED DESCRIPTION

Figure 1:
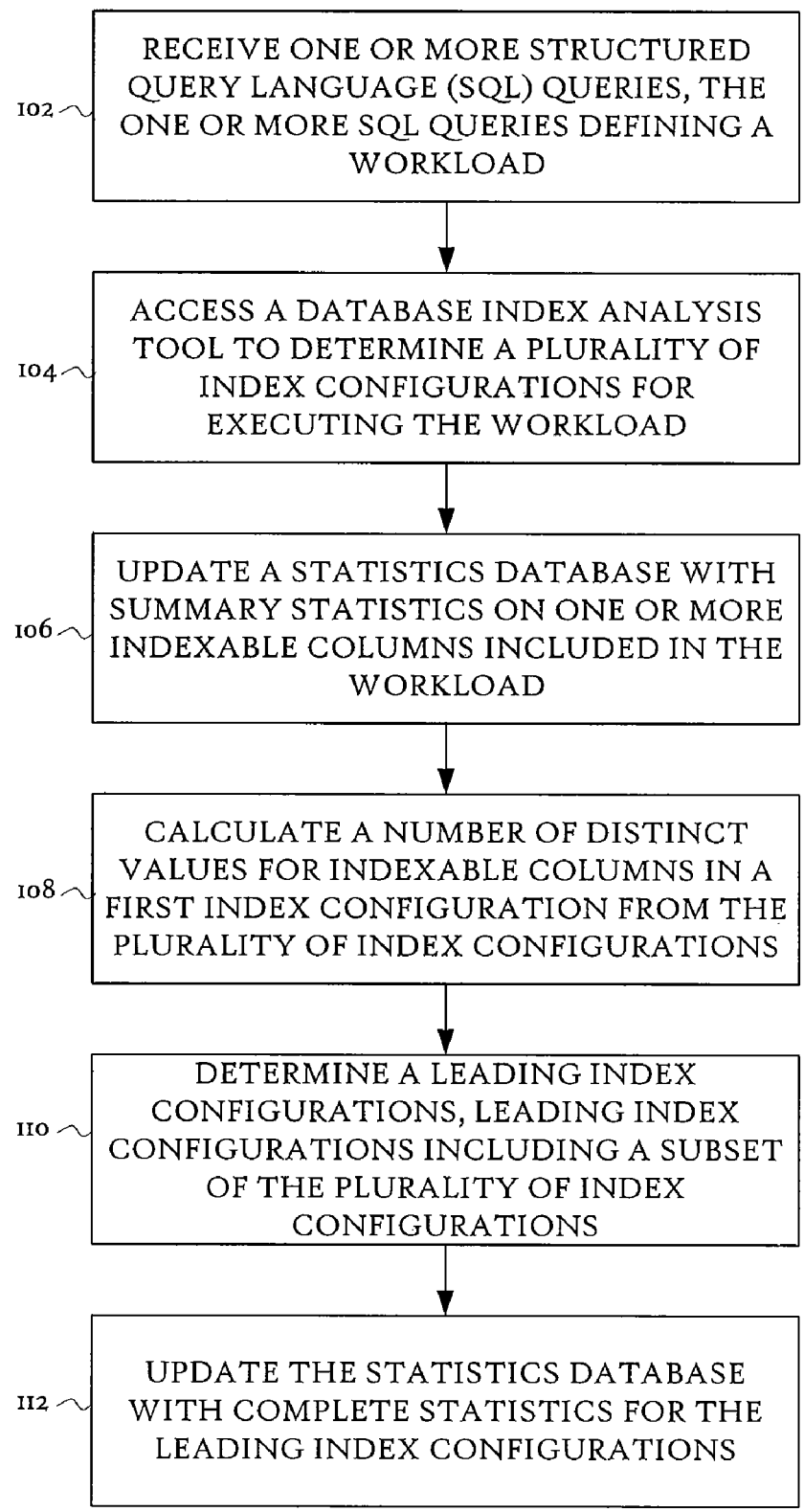
FIGS. 1-2 are flowchart diagrams illustrating methods to determine leading index configurations, according to an example embodiment.

The following detailed description includes references to the accompanying drawings, which form a part of the detailed description. The drawings show, by way of illustration, specific embodiments in which the invention may be practiced. These embodiments, which are also referred to herein as "examples," are illustrated in enough detail to enable those skilled in the art to practice the invention. The embodiments may be combined, other embodiments may be utilized, or structural, logical, and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein."

In an example embodiment, physical database design is an important step to implementing a high performance data warehouse. Often during this process users may make decisions regarding the physical characteristics of their relational tables and columns. Included in design is the selection of columns on which to define indexes to improve query performance. In some example embodiments, the process of making these choices manually is difficult and mistake prone. To this end, Database Management Systems (DMBS) often provide automated index selection tools that examine a user's workload (e.g., a set of queries) and make column recommendations for indexes.

In an example embodiment, index selection tools work in conjunction with a query optimizer tool (Optimizer) to evaluate potential new indexes. This may be accomplished by simulating the existence of an index candidate and then calling the Optimizer to generate a plan that might use the new index to reduce costs. Costs may be considered the amount of system resources consumed during the execution of a query. In some examples, resources may include, but are not limited to one or more central processor units (CPU), random access memory (RAM), read only memory (ROM), hard disk space, input and output operations, or time.

In some example embodiments, cost-based optimizers rely on statistics that describe the distribution of values within the indexed column(s). Such statistics may be used for accurate costing and plan selection and may also be used by the index selection tool. In an example embodiment, if index statistics are not available, the Optimizer may be discouraged from considering an index. Further, even if it is considered and chosen, the associated confidence in its cost improvement may be low. As a result, one of the first steps performed by an index selection tool is often the collection of statistics on indexable columns appearing within query search conditions of a specified workload.

In an example embodiment, while collecting statistics on potential single column candidate indexes is a low cost event, collecting statistics on multi-column candidate indexes may be cost intensive. For example, given N columns appearing together in a given query search condition, (e.g., colA=10 AND colB=20) the number of different column combinations is $(2^{**}N-1)$ and N can be large for complex search conditions. The resource overhead and elapsed time required to collect statistics on all such combinations may be beyond acceptable business limits. In some example embodiments, an option of using dynamically acquired statistics during query optimization is not possible because such indexes are only simulated within the data dictionary (a data store including information on objects/tables, etc.) and have no underlying physical structure.

In an example embodiment, an efficient method for acquiring statistics on multi-column candidates considered during the index selection process is used. The method may involve two steps. First, summary statistics may be generated for every multi-column index candidate that is considered by deducing them from already collected single column statistics. In an example embodiment the first step provides the minimum statistics needed by the Optimizer to sufficiently consider every candidate.

Second, detailed statistics may be collected on the underlying data for every leading multi-column index candidate where the term "leading" is used to describe a candidate that is currently the best found during key points of the analysis process, and as a result has a greater than average chance of becoming the final recommendation. The second step may provide complete detailed statistics to further evaluate leading candidates that were originally chosen using minimal statistics. In example embodiments, the number of leading candidates considered in the second step is fewer than the number of candidates considered in the first step.

In an example embodiment, the system described avoids a potential worst case outcome from a lack of statistics that results in a final index recommendation that provides no benefit to the workload queries. Often such indexes consume disk space and potentially incur maintenance overhead during updates. Thus, while it may not be feasible to collect statistics for every index candidate, it is feasible for a limited number of "leading" or "best thus far" candidates and doing so may increase the quality of final recommendations.

System Overview

This following descriptions will detail an example DMBS (e.g., Teradata). The syntax used for specific functions is exemplary only and should not be used to limit the scope of the methods described herein. The methods and systems described may be used in any DBMS or other types of systems as one skilled in the art will recognize.

In an example embodiment, the DBMS supports multi-column indexes. The basic syntax for defining a multi-column secondary index may be:

```
CREATE [UNIQUE] INDEX (column_name, column_name [... ,
column_name] )
ON table_name;
``` where the specified column list can contain up to 64 columns.

A Index Wizard tool in the DMBS may consist of a front-end user interface and a back-end server component that contains the intelligence for performing index selection. Index Selection or "Analysis" may be invoked by issuing the following SQL statement:

```
INITIATE INDEX ANALYSIS ON <table_list>
FOR <workload> IN <query_capture_database>
[SET COLUMNSPERINDEX = <number>]
``` where <workload> is the name previously associated with one or more queries. In an example embodiment, the result of this statement is a set of recommended index definitions defined on the tables specified in <table_list>. The recommendations may be stored within a named set of pre-defined dictionary tables that are identified by <query_capture_database> (QCD). If the optional COLUMNSPERINDEX parameter is specified, the index selection process may restrict the search to indexes whose number of columns is less than or equal to <number>. In an example embodiment, a default number is used for COLUMNSPERINDEX (e.g., 4).

In an example embodiment, the DBMS supports a command to collect detailed statistics. Statistics may be collected on a group of one or more table columns using the SQL command syntax shown below.

```
/* Collecting on a specific column list */
    COLLECT STATISTICS ON <table_name> <column_name>
    [,<column_name> ...];
```

In some example embodiments, this command will scan and sort the underlying data to generate the frequency for each distinct value which in turn is used to build an equi-height histogram that is stored in the data dictionary for use later by the Optimizer. The histogram may be composed of a set of intervals or "buckets" that accurately describe the value distribution of the underlying column(s) data. Furthermore, in an example embodiment, the INITIATE INDEX ANALYSIS statement issued by an index tool has the ability to internally issue Collect Statistics statements, as described above, on those sets of columns that it considers leading index candidates.

FIG. 1 illustrates an example method of generating recommended multi-column indexes. In an example embodiment, an example DBMS is configured as described above and is used to implement the method. At block 102, one or more structured query language (SQL) queries are received, the one or more SQL queries defining a workload. In an example embodiment, workloads to be analyzed are defined by identifying one or more queries (e.g., from an execution log) and performing query capture on them to store query and optimizer plan information within the query capture database. This process may be facilitated by, for example, a user interface displayed on a display device which allows input from a user to be transmitted to the DBMS. The captured queries may then be associated with a common workload name by executing a system supplied macro. For example, users may perform query capture by preceding a SQL statement (e.g., SELECT) with the keywords INSERT EXPLAIN:

INSERT EXPLAIN [WITH STATISTICS] INTO
    <query_capture_database> <sql_statement>;

In some example embodiments during query capture, statistics may be collected on columns appearing in WHERE conditions in anticipation of their usage during a subsequent analysis. In an example embodiment an initial analysis is done during query capture to limit the statistics collections to those columns appearing in indexable search conditions. Further, statistics may be collected using sampling which requires only a small percentage of the data to be read and sorted to reduce the time required to perform query capture during workload definition. In an example embodiment, statistics collections are limited to single columns only during the workload definition.

At block 104, a database index analysis tool is accessed to determine a plurality of index configurations for executing the workload. In an example embodiment, each index configuration from the plurality of index configurations includes one or more indexes. In some example embodiments, the plurality of index configurations includes at least one multi-column index.

At block 106, in example embodiments, a statistics database with summary statistics on one or more indexable columns included in the workload is updated. In an example embodiment "summary statistics" is used to identify the minimum statistics needed by the Optimizer to sufficiently estimate predicate selectivities (i.e., the number of qualifying rows) and generate cost estimates whose confidence is greater than zero. For example, summary statistics may include a number of distinct values in indexable columns in an index configuration. The number of distinct values permits the Optimizer to estimate the selectivity of a number of different predicate types including explicit conditions (e.g., colA=10) and join conditions (e.g., t1.colA=t2.ColB). The total row count is the same for all index statistics on a given table and hence does not need to be derived. However, the number of distinct values are potentially different for every combination of column values.

At block 108, the number of distinct values for indexable columns in a first index configuration from the plurality of index configurations is calculated. In an example embodiment this may be done during the course of Index Analysis. For example, when simulating the existence of a given candidate consisting of two or more columns, summary statistics may be derived from the relevant single column statistics and made available to the Optimizer during its costing and plan selection. In further example embodiments, in the absence of collected statistics generated by the COLLECT STATISTICS statement or INSERT EXPLAIN WITH STATISTICS statements as described above, the Optimizer may acquire summary statistics via a small sample of the index sub-table rows which may be used to estimate the number of distinct values. However, because there may be no underlying index sub-tables for simulated candidate indexes considered during Index Analysis, a statistics deduction formula may be used. In an example embodiment, the following formula is used:

MCOL_VALS=min{TOTAL_ROWS, for i=1 to n, product of COL_VALSi}

Where:

MCOL_VALS=number of distinct values for an index with n columns where n>1

TOTAL_ROWS=total number of rows in the table

COL_VALSi=number of distinct values for a single column whose is the ith column of the index Consider a table 't1' with 10,000 total rows and columns 'a' and 'b' whose number of distinct values are 100 and 25 respectively, the formula above would estimate the number of distinct values for (a,b) as 2500. This number may be revised at a later stage using more accurate statistics if the index candidate is considered a leading index configuration as will be described in more detail below.

At block 110, leading index configurations may be determined, where leading index configurations include a subset of the plurality of index configurations. An example method in which this may occur is described in further detail with respect to FIG. 2. However, in an example embodiment, leading index configurations represent index configurations where it may be worth the extra overhead to conduct a full statistics collection. For instance, an estimated cost of executing the workload with each index configuration may be determined. Then, the plurality of index configurations may be sorted by the estimated cost (e.g., the amount of resources consumed during the execution of the workload). The index configuration with the lowest cost may be considered a leading index configuration. In an example embodiment, an estimated cost of executing the workload with each leading index configuration is determined. The plurality of index configurations may be re-sorted based on the estimated costs of executing the workload with each leading index configuration. Then, the new lowest cost index configuration may be considered a leading index configuration.

At block 112 a statistics database is updated with complete statistics for the leading index configurations. In an example embodiment, a final recommended index configuration is stored in a query database as a function of the database index analysis tool analyzing the leading index configurations.

Determining Leading Candidates

In an example embodiment, upon determining a set of index configurations, leading candidates are determined from the index configurations. Because the possible solution space of multi-column index candidates may be large, a method may be needed to determine the right number of leading candidates. A method that simply identifies every "best thus far" candidate encountered during the course of the entire analysis may result in too many collections. On the other extreme, limiting statistics collections to only the very last best candidate (the final recommendation) would fail to consider other leading candidates. In some example embodiments, the cost of the last best candidate might end up being much higher after it is re-costed with detailed statistics.

As stated previously, sampled statistics will be collected on every leading candidate during the Analysis process and stored in the Query Capture Database for potential use by the Optimizer. In some index selection tools, the selection process is performed using a combinatorial search algorithm that is capable of exploring a large solution space. In an example embodiment, a genetic algorithm is used to identify the leading candidate index configurations.

Generally, genetic algorithms (GA) find exact or approximate solutions to optimization or search problems by abstracting a random selection of possible solutions and applying three operations—selection, crossover, and mutation—over a series of iterations (sometimes called generations) to the set of possible solutions. Common terminology refers to the set of possible solutions as a population with each solution being referred to as a chromosome. A characteristic of GAs allows a final solution to be reached without the algorithm needing any knowledge of the problem. In an example embodiment, the population is encoded as strings (e.g., a binary string of a fixed-length) and a fitness function is defined that evaluates the strings. In some example embodiments, the fitness is the cost of executing the workload queries with the index configuration defined. In further example embodiments, each index configuration has an artificial identification that is used as the chromosome and a mapping component maps the index configurations to actual index definitions.

In example embodiments, the three operations above generate a more-fit population with each generation. In an example embodiment, selection will select the better than-average chromosomes in the population on which to apply the crossover and mutation operations. In an example embodiment, the selection operation creates two copies of the most fit chromosome and the least fit chromosome is dropped from the population. In an example embodiment, the crossover operations generates a new string from two of the strings in the population. For example, a break-point may be defined such that everything to the right of the breakpoint is exchanged. Consider a string A "00000" and string B "11111" where a new string may be generated "00111." In an example embodiment, mutation involves randomly flipping a portion of string (e.g., from a 1 to a 0). In some example embodiments, a variable is defined whose value represents the chance a bit of a string will switch.

Figure 2:
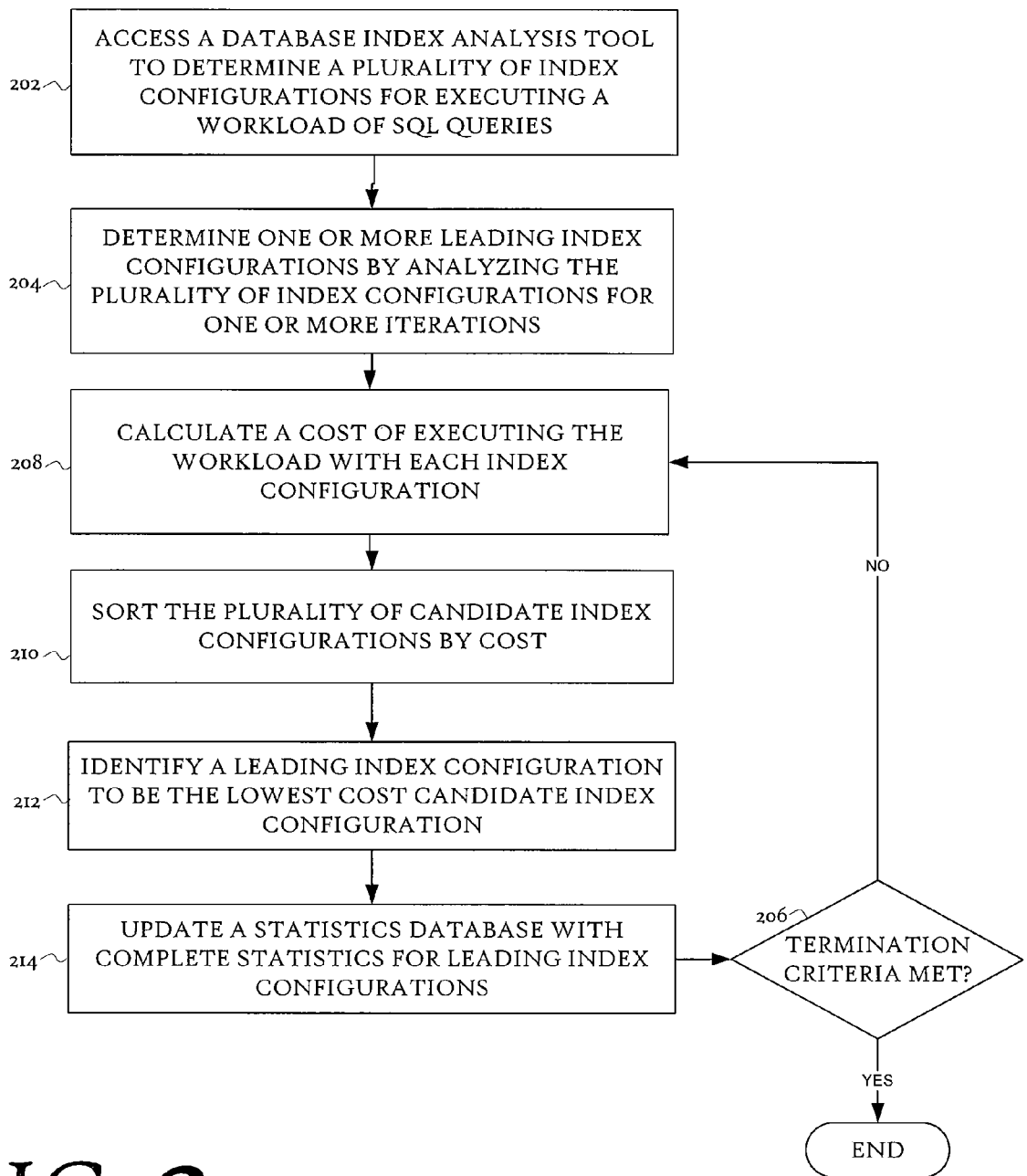

FIG. 2 illustrates an example method using a genetic algorithm to find leading index configurations. At block 202, in an example embodiment, a database index analysis tool is accessed to determine a plurality of index configurations for executing a workload of SQL queries, the plurality of index configurations including at least one multi-column index. This process is more fully explored with reference to FIG. 1.

At block 204, in an example embodiment, one or more leading index configurations are determined by analyzing the plurality of index configurations for one or more iterations. In an example embodiment an initial cost of executing the workload using each of the index configurations is calculated. In an example embodiment, a GA is applied to the plurality of index configurations for each iteration. A chromosome in some example embodiments represents a candidate index configuration consisting of one or more indexes. The number of chromosomes used may be predefined (e.g., 30). Each chromosome may be assigned a "fitness" which is the cost of executing the workload queries with the index configuration defined. In some example embodiments the maximum number of iterations is predefined (e.g., 25) and may be fewer if early termination criteria are met at block 206. In an example embodiment, a termination criteria may be based on the leading candidate index configuration containing no multi-column indexes. In further example embodiments, a termination criteria may be based on the leading index configuration being the same for a predetermined number of iterations (e.g., 5) In an example embodiment, after the initial cost has been determined the genetic algorithm applies selection, crossover, and mutation to the population.

At block 208, in an example embodiment, a cost of executing the workload with each index configuration is calculated. At block 210, in an example embodiment, the plurality of candidate index configurations are sorted by cost. At block 212, in an example embodiment, a leading index configuration is identified to be the lowest cost candidate index configuration. This may represent the current best chromosome. The indexes within this chromosome may be searched to determine those that consist of multiple columns. For each such index, sampled statistics are collected and the Optimizer is called to regenerate the query plans and associated costs which then become the updated fitness for that chromo; the chromo is then marked as having been re-costed.

In an example embodiment, complete statistics on the leading index configuration are collected and the plurality of index configurations are resorted based on the complete statistics. In an example embodiment, complete statistics include a frequency for each distinct value in columns included in the leading index configuration. Then, in an example embodiment, if the current best chromosome has already been re-costed or if it has no multi-column indexes, it becomes the final leading candidate for the current generation. Otherwise, the process repeats itself for the newly identified best chromosome. At block 214, in an example embodiment a statistics database is updated with complete statistics for leading index configurations.

Figure 3:
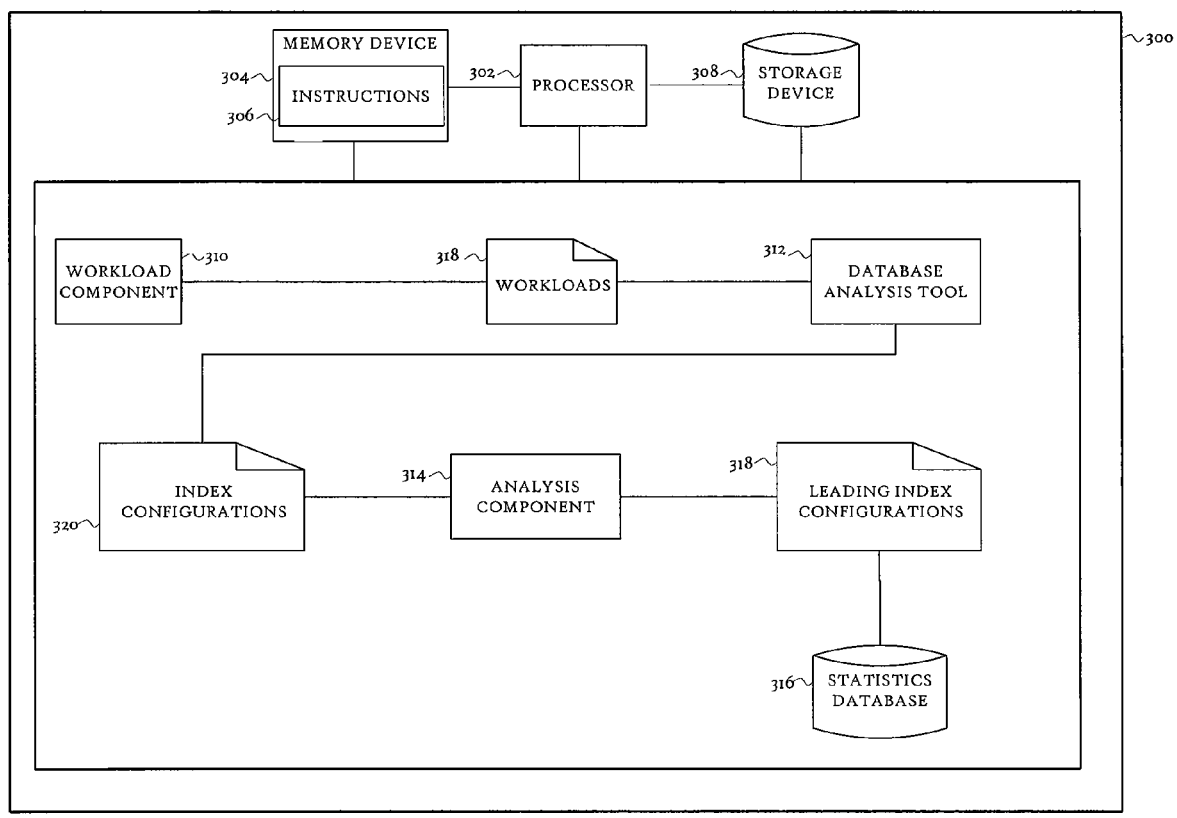
FIG. 3 is a system diagram illustrating an example system to determine leading index configurations, according to an example embodiment.

This re-costing may occur at most the number of chromosomes times (e.g., 30 times if there are 30 chromosomes) for a given iteration. Although the process of collecting statistics and re-optimizing queries is a relatively expensive operation, the maximum number of occurrences in this example is limited to 750=30 (number of chromos)*25 (max# generations). Hence, the worst-case in this example is a relatively small number and in practice will be much smaller. In addition, in an example embodiment, statistics for a given column combination need to be collected only once during the entire Analysis; column combinations that were already collected for a prior chromosome or during a prior generation are not recollected. Similarly, column combinations that already have stored collected statistics may not require any deducing of summary statistics. In an example embodiment, the use of detailed stored statistics are preferred over generated summary statistics. In an example embodiment, a final recommended index configuration is stored in a query database as a function of the database index analysis tool analyzing the leading index configurations FIG. 3 illustrates a system 300, according to an example embodiment, which may be used to implement the methods and features described above. Illustrated is processor 302, memory device 304 with instructions 306 stored thereon, and storage device 308. Further illustrated are a plurality of software components and databases including workload component 310, database index analysis tool 312, analysis component 314, and statistics database 316. While not fully illustrated, the components and databases, processor 302, memory device 304, and storage device 308 may be communicatively coupled to each other such that any one part of the system may communicate with any other part of the system. In some example embodiments, portions of the system are combined. For example storage device 308 may include statistics database 316.

These components may perform the functions of the methods described above. For instance, in an example embodiment, workload component 310 receive one or more structured query language (SQL) queries, the one or more SQL queries defining a workload 318. Workload 318 may be transmitted to database index analysis tool 312 which may be used to determine a plurality of index configurations 320 for executing the workload. The plurality of index configurations 320 may be transmitted to analysis component 314 to determine leading index configurations 322, leading index configurations including a subset of the plurality of index configurations. Statistics database 316 may be configured to be updated with complete statistics for leading index configurations 322.

Listed below is example pseudo C-style code for implementing the methods and systems described above. In an example embodiment, instructions 306 include an implementation of the code.

```
#define MAXCHROMO 30
#define MAXGENERATIONS 25
Chromosome Population[MAXCHROMO];
Chromosome *BestChromo;
/* Generate an initial random population */
Initialize_Pop(Population);
/* Call Optimizer with each chromo simulated and record fitness */
for (ii = 0; ii < MAXCHROMO; ii++)
{
    DeduceMColStats(Population[ii]); /* summary stats */
    Simulate_Indexes(Population[ii]);
    Population[ii].Fitness = Optimizer(Population[ii]);
    Population[ii].ReCosted = false;
}
for (GenCnt = 1; GenCnt < MAXGENERATIONS &&
!TerminateEarly( ); GenCnt++)
{
// Perform mutation, crossover, and selection on current population
Genetic_Operations(Population);
/* Compute fitness of each chromo in the resulting population */
for (ii = 0; ii < MAXCHROMO; ii++)
{
    DeduceMColStats(Population[ii]); /* summary stats */
    Simulate_Indexes(Population[ii]);
    Population[ii].Fitness = Optimizer(Population[ii]);( )
}
/* Sort chromos in ascending order of cost */
SortByFitness(Population);
BestChromo = Population[0];
/* Collect Stats on multi-column indexes within the current best
chromo and call the
** Optimizer to produce a more accurate fitness. Continue until the
current best
** chromo has already been re-costed or doesn't have any multi-col
indexes. */
While (MColsExist(BestChromo) && !BestChromo->ReCosted)
{
    CollectMColStats(BestChromo); /* full detailed stats stored
    in QCD */
    Simulate_Indexes(BestChromo);
    BestChromo->Fitness = Optimizer(BestChromo);
    BestChromo->ReCosted = true;
    SortByFitness(Population);
    BestChromo == Population[0];
}
}
```

Distributed Computing Components

Some example embodiments may include the previously illustrated components (e.g., operations) being implements across a distributed programming environment. For example, operations providing logic functionality may reside on a first computer system that is remotely located from a second computer system containing an Interface or Storage functionality. These first and second computer systems can be configured in a server-client, peer-to-peer, or some other configuration. These various levels can be written using the above illustrated operation design principles and can be written in the same programming language, or a different programming language. Various protocols are implemented to enable these various levels, and operations contained therein, to communicate regardless of the programming language used to write these operations. For example, a module written in C++ using the Common Object Request Broker Architecture (CORBA) or Simple Object Access Protocol (SOAP) can communicate with another remote module written in Java. These protocols include SOAP, CORBA, or some other suitable protocol. These protocols are well-known in the art.

A System of Transmission Between a Server and Client

In some embodiments, the above illustrated operations that make up the platform architecture communicate use the Open Systems Interconnection Basic Reference Model (OSI) or the Transmission Control Protocol/Internet Protocol (TCP/IP) protocol stack models for defining network protocols that facilitate the transmission of data. Applying these models, a system of data transmission between a server and client computer system can be illustrated as a series of roughly five layers comprising as a: physical layer, data link layer, network layer, transport layer and application layer. Some example embodiments may include the various levels (e.g., the Interface, Logic and storage levels) residing on the application layer of the TCP/IP protocol stack. The present application may utilize HTTP to transmit content between the server and client applications (e.g., the DBMS and a client computer), whereas in other embodiments another protocol known in the art is used. Content from an application residing at the application layer is loaded into the data load field of a TCP segment residing at the transport layer. This TCP segment also contains port information for a recipient application or a module residing remotely. This TCP segment is loaded into the data field of an IP datagram residing at the network layer. Next, this IP datagram is loaded into a frame residing at the data link layer. This frame is then encoded at the physical layer and the content transmitted over a network such as the Internet, Local Area Network (LAN) or Wide Area Network (WAN). The term Internet refers to a network of networks. Such networks may use a variety of protocols for exchange of information, such as TCP/IP etc., and may be used within a variety of topologies or structures. This network may include a Carrier Sensing Multiple Access Network (CSMA) such as an Ethernet-based network. This network may include a Code Division Multiple Access (CDMA) network or some other suitable network.

A Computer System

Figure 4:
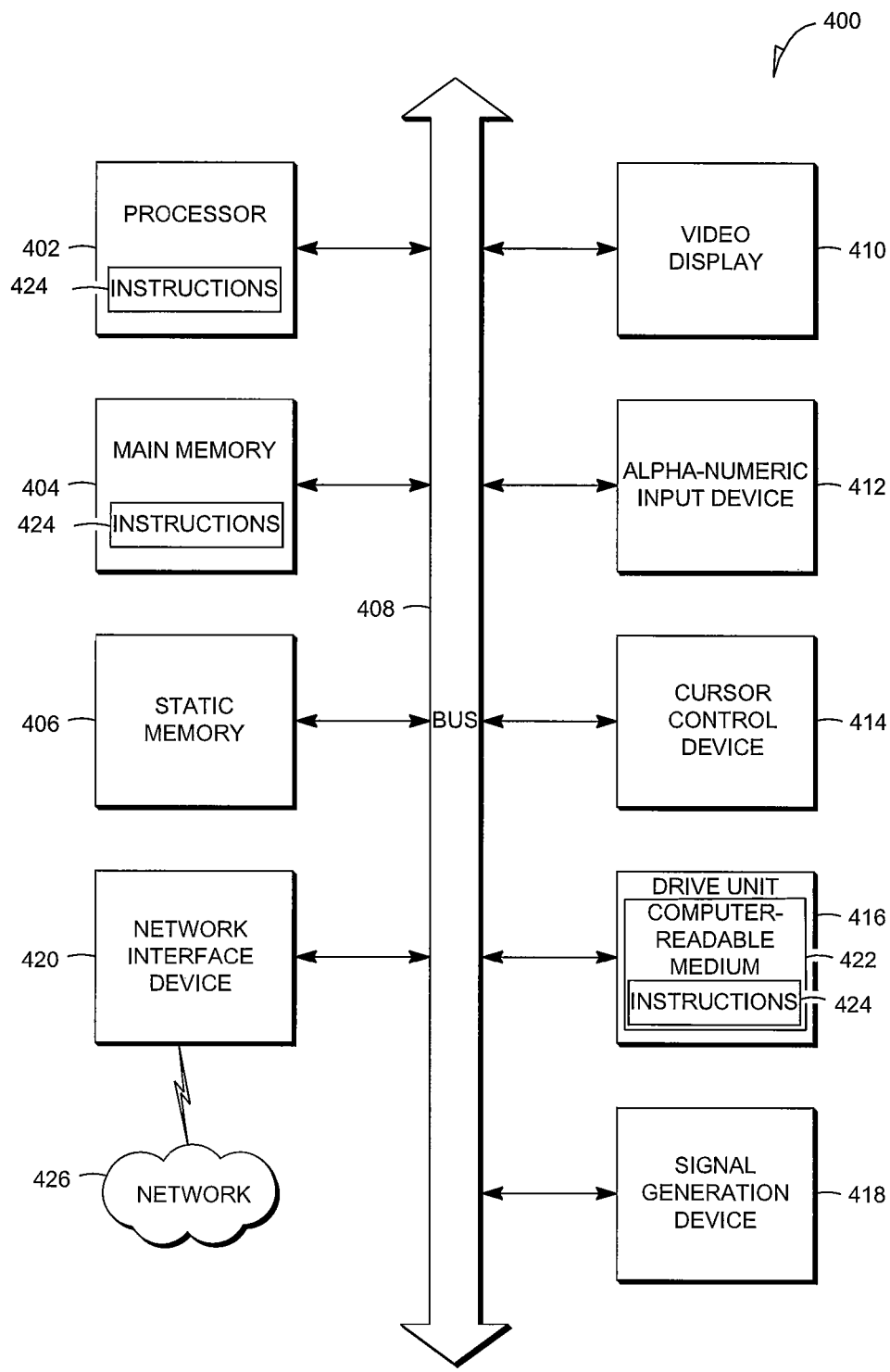
FIG. 4 illustrates a computer system, according to an example embodiment.

FIG. 4 shows a diagrammatic representation of a machine in the example form of a computer system 400 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled. Also, in the following claims, the terms "including" and "comprising" are open-ended, that is, a system, device, article, or process that includes elements in addition to those listed after such a term in a claim are still deemed to fall within the scope of that claim.

What is claimed is:

1. A method comprising:
receiving one or more structured query language (SQL) queries, the one or more SQL queries defining a workload;
accessing a database index analysis tool to determine a plurality of index configurations for executing the workload;
determining leading index configurations, leading index configurations including a subset of the plurality of index configurations; and
updating a statistics database with complete statistics for the leading index configurations.

2. The method of claim 1, wherein each index configuration from the plurality of index configurations includes one or more indexes.

3. The method of claim 2, wherein the one or more index configurations includes at least one multi-column index.

4. The method of claim 1, further including:
calculating a number of distinct values for indexable columns in a first index configuration from the plurality of index configurations.

5. The method of claim 1, further including:
determining an estimated cost of executing the workload with each index configuration; and
sorting the plurality of index configurations by the estimated costs.

6. The method of claim 5, further including:
determining an estimated cost of executing the workload with each leading index configuration; and
re-sorting the plurality of index configurations based on the estimated costs of executing the workload with each leading index configuration.

7. The method of claim 1, further including:
updating the statistics database with summary statistics on one or more indexable columns included in the workload.

8. The method of claim 7, wherein summary statistics include a number of distinct values in indexable columns in the index configuration.

9. The method of claim 1, further including storing a final recommended index configuration in a query database as a function of the database index analysis tool analyzing the leading index configurations.

10. A method comprising
accessing a database index analysis tool to determine a plurality of index configurations for executing a workload of SQL queries, the plurality of index configurations including at least one multi-column index;
determining one or more leading index configurations by analyzing the plurality of index configurations for one or more iterations, wherein each iteration includes:
calculating a cost of executing the workload with each index configuration;
sorting the plurality of candidate index configurations by cost; and
identifying a leading index configuration to be the lowest cost candidate index configuration; and
updating a statistics database with complete statistics for leading index configurations.

11. The method of claim 10, further including:
storing a final recommended index configuration in a query database as a function of the database index analysis tool analyzing the leading index configurations.

12. The method of claim 10, wherein analyzing the plurality of index configurations includes applying a genetic algorithm to the plurality of index configurations for each iteration.

13. The method of claim 12, wherein applying the genetic algorithm includes:
terminating a current iteration from the one or more iterations based on the leading candidate index configuration containing no multi-column indexes.

14. The method of claim 12, wherein applying the genetic algorithm includes:
terminating a current iteration from the one or more iterations based on the leading index configuration being the same for a predetermined number of iterations.

15. The method of claim 10, further including:
calculating an initial cost of executing the workload using each of the index configurations.

16. The method of claim 10, wherein identifying a leading index configuration to be the lowest cost candidate index configuration includes:
collecting complete statistics on the leading index configuration; and
resorting the plurality of index configurations based on the complete statistics.

17. The method of claim 16, wherein complete statistics include a frequency for each distinct value in columns included in the leading index configuration.

18. A system comprising:
a processor operable to execute instructions;
a storage device;
a memory device storing instructions, which when executed by the processor are operable to manage:
a workload component to receive one or more structured query language (SQL) queries, the one or more SQL queries defining a workload;
a database index analysis tool to determine a plurality of index configurations for executing the workload;
an analysis component to determine leading index configurations, leading index configurations including a subset of the plurality of index configurations; and
a statistics database configured to be updated with complete statistics for the leading index configurations.

* * * * *